(12) United States Patent
Pfestorf

(10) Patent No.: US 11,131,002 B2
(45) Date of Patent: Sep. 28, 2021

(54) METHOD FOR PRODUCING A HIGH STRENGTH TUBE PART

(71) Applicant: Bayerische Motoren Werke Aktiengesellschaft, Munich (DE)

(72) Inventor: Markus Pfestorf, Neufahrn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/371,937

(22) Filed: Apr. 1, 2019

(65) Prior Publication Data

US 2019/0226042 A1 Jul. 25, 2019

Related U.S. Application Data

(63) Continuation of application No. PCT/EP2017/073965, filed on Sep. 22, 2017.

(30) Foreign Application Priority Data

Oct. 5, 2016 (DE) .................... 10 2016 219 278.7

(51) Int. Cl.
| | | |
|---|---|---|
| *C21D 9/08* | (2006.01) | |
| *B21D 5/01* | (2006.01) | |
| *C21D 8/10* | (2006.01) | |
| *B21D 37/16* | (2006.01) | |
| *B62D 25/00* | (2006.01) | |
| *B23G 1/22* | (2006.01) | |

(52) U.S. Cl.
CPC .............. *C21D 9/08* (2013.01); *B21D 5/015* (2013.01); *B21D 37/16* (2013.01); *B23G 1/22* (2013.01); *B62D 25/00* (2013.01); *C21D 8/10* (2013.01); *C21D 2221/00* (2013.01); *C21D 2261/00* (2013.01)

(58) Field of Classification Search
CPC .............. C21D 1/02; C21D 8/10; C21D 9/08
See application file for complete search history.

(56) References Cited

U.S. PATENT DOCUMENTS

| | | | | |
|---|---|---|---|---|
| 2,891,804 A * | 6/1959 | Frayne | .................... | B62D 25/00 280/805 |
| 6,296,805 B1 | 10/2001 | Laurent et al. | | |
| 6,758,921 B1 * | 7/2004 | Streubel | .................. | B21D 53/88 148/519 |
| 7,842,142 B1 * | 11/2010 | Kusumi | .................. | C21D 1/673 148/531 |
| 2004/0145140 A1 * | 7/2004 | Chen | ........................ | B62K 9/00 280/87.01 |
| 2005/0081964 A1 * | 4/2005 | Urband | ..................... | C21D 1/30 148/508 |
| 2008/0283237 A1 * | 11/2008 | Buytaert | ............. | E21B 17/1028 166/196 |
| 2010/0084892 A1 * | 4/2010 | Yoshida | ............... | B62D 25/082 296/203.02 |
| 2014/0166166 A1 * | 6/2014 | Zimmermann | ........ | C21D 1/673 148/714 |
| 2014/0265449 A1 * | 9/2014 | Davis | .................... | B60R 13/025 296/193.06 |
| 2016/0033059 A1 * | 2/2016 | Fonte | ..................... | C22F 1/183 138/171 |
| 2017/0136874 A1 * | 5/2017 | Harris | .................... | B60K 17/34 |

FOREIGN PATENT DOCUMENTS

| | | | | |
|---|---|---|---|---|
| CN | | 1714162 A | 12/2005 | |
| CN | | 1738687 A | 2/2006 | |
| DE | 10 2008 025 165 A1 | | 12/2009 | |
| EP | | 1 790 422 B1 | 2/2012 | |
| EP | | 2 762 577 A1 | 8/2014 | |
| EP | | 2762577 A1 * | 8/2014 | .............. C21D 1/09 |
| JP | | 3-287726 A | 12/1991 | |
| JP | | 6-256854 A | 9/1994 | |
| WO | WO 2015/017212 A1 | | 2/2015 | |
| WO | WO-2015017212 A1 * | | 2/2015 | |
| WO | WO 2015/200325 A1 | | 12/2015 | |

OTHER PUBLICATIONS

I. A. Useinov et al., "Apparatus for heat treating sleeve pipes after thread cutting," Metal Science & Heat Treatment, vol. 16, Nos. 7-8, pp. 594-596, Jul.-Aug. 1974 (publ. Jan. 1975) (Year: 1975).*
International Search Report (PCT/ISA/210) issued in PCT Application No. PCT/EP2017/073965 dated Dec. 18, 2017 with English translation (five (5) pages).
German-language Written Opinion (PCT/ISA/237) issued in PCT Application No. PCT/EP2017/073965 dated Dec. 18, 2017 (five (5) pages).
German-language Search Report issued in counterpart German Application No. 10 2016 219 278.7 dated Jun. 7, 2017 with partial English translation (11 pages).
Chinese Office Action issued in Chinese counterpart application No. 201780039650.9 dated Aug. 30, 2019, with English translation (Eleven (11) pages).
German-language European Office Action issued in European application No. 17 776 982.5-1016 dated May 14, 2020 (Five (5) pages).

* cited by examiner

*Primary Examiner* — Anthony J Zimmer
*Assistant Examiner* — Sean P. O'Keefe
(74) *Attorney, Agent, or Firm* — Crowell & Moring LLP

(57) ABSTRACT

A method for producing a high strength tube part is provided. The method includes the acts of: producing a sheet metal blank, producing a tube part by cold forming the sheet metal blank, and hardening the tube part at least in some sections to a high strength tube part.

5 Claims, No Drawings

METHOD FOR PRODUCING A HIGH STRENGTH TUBE PART

CROSS REFERENCE TO RELATED APPLICATIONS

This application is a continuation of PCT International Application No. PCT/EP2017/073965, filed Sep. 22, 2017, which claims priority under 35 U.S.C. § 119 from German Patent Application No. 10 2016 219 278.7, filed Oct. 5, 2016, the entire disclosures of which are herein expressly incorporated by reference.

BACKGROUND OF THE INVENTION

The present invention relates to a method for producing a high-strength tube part.

In modern-day motor vehicle construction, add-on parts such as trim parts and the like, or other units such as transmissions, engine mounts, auxiliary frames and the like, are mounted on the supporting main structure or on the vehicle body. For this purpose, provision has been made to date to provide receptacles for receiving fastening devices on the add-on parts or on the structural parts. By way of example, threaded bushings, screw nuts and the like are fastened to said structural parts. This is done in a separate assembly step, for example by welding. For some time, however, what are termed tube parts have become established in vehicle construction. What is termed the tube provides possibilities for attachment directly in the sheet-metal part or in the component, and therefore it is possible to dispense with additional fastening devices, such as for example threaded bushings, etc. The tube is integrated integrally, i.e., in one piece, in the sheet-metal part. In order to introduce the tube into the sheet-metal part, it has been possible to date to use only soft steels as starting material of the sheet-metal blank. As a result, such tube parts overall have a low strength. Since tube parts known from the prior art have a low strength, in order to be able to achieve relatively high degrees of forming, they are unsuitable for use as structural and safety components.

DETAILED DESCRIPTION OF THE INVENTION

Proceeding from this prior art, the present invention is based on the object of specifying a method with which it is possible to produce tube parts which satisfy the requirements in respect of safety and structural components.

To achieve this and other objects, the invention proposes a method for producing a high-strength tube part. A method according to an embodiment of the invention includes the following steps: producing a sheet-metal blank, producing a tube part by cold forming the sheet-metal blank, wherein the tube part is hardened at least in portions to form a high-strength tube part. As a result, the high-strength tube parts can be used in what is termed the load path of the bodyshell, which is intended to ensure protection of the occupants in the event of a crash.

Furthermore, the tube part can be hardened in a hot-forming step. This affords the advantage that tube parts with a tensile strength in the region of e.g., >1300 MPa can be produced. For the purposes of this invention, the hot-forming step is to be understood as meaning that the main forming work of the sheet-metal blank is effected by cold forming, and only minor residual forming takes place during the hot forming. As an alternative thereto, it is also contemplated that a geometric change in the component geometry cannot take place in the hot-forming step, and therefore, within the context of press hardening or calibration, only the strength values, but not the geometry, of the tube part are increased. The use of press-hardened or hot-formed components makes it possible to achieve a reduction in weight, since it is possible to achieve a lower wall thickness given the same mechanical properties of the component.

According to a first variant of the method, machining, in particular the introduction of threads into the tube, is effected after the hardening of the tube part, wherein the tube part has softer and harder portions. The tube or the region in which machining is effected corresponds to a portion of the tube part which is soft after the hardening step. The tube part has lower strength values in this region than in the remaining region of the high-strength tube part.

In the unhardened tube part, the tube part can have strength values which correspond to the strength value of the material of the starting blank. As a result, particularly simple machining, in which the wear of the machining tool is reduced to a minimum, can advantageously be effected. In other words—in order to ensure reworking of the possible thread in the tube—this portion of the tube or of the tube part is left in a soft state, or soft-annealing is subsequently carried out in said portion. This can be effected by typical methods for producing soft portions in hot-formed or press-hardened components. Measures of this nature may be, for example, the use of an absorber mass or of a heat shield in the furnace in which the already cold-formed tube part is heated. As an alternative, for this purpose it is also possible to use a 3D radiant heater, with which only those regions of the cold-formed tube part which are to be hardened are heated, with regions which are not to be hardened not being covered by the 3D radiant heater. As an alternative thereto, however, measures can also be achieved in the hot-forming step or during the press-hardening. In the case of these measures, part of the forming tool is heated, or provision is made of thermal insulation between the heated tube part and the hot-forming tool, for example in the form of an air gap. The component thus experiences slower cooling in said region, with the result that a lower strength is established in said portion. Not least, it is possible for measures to be carried out on the hardened component, for example with certain portions of the high-strength tube part being heated by induction tempering, as a result of which the high strength achieved initially by hardening is reduced again in said region.

In a second variant of the method, machining, in particular the introduction of threads, can take place before, during or after the cold-forming, but always before the hardening of the tube part. This affords the advantage that the tube part is machined in a soft state, with the wear on the tools being reduced to a minimum. The machining can preferably be effected directly in the cold-forming step. A particularly time-optimized method variant is achieved here.

Furthermore, a hot-formable steel, in particular 22MnB5, can be used as the material for the tube part. This involves a martensite-hardenable heat-treatable steel, the high-strength properties of which are established only during the hot-forming by conversion into a martensitic microstructure. In the initial state, the strength of manganese-boron steel grades is approximately 600 MPa. After they have been hardened, for example by hot forming, a tensile strength of up to approximately 1800 MPa can be achieved. Conventional manganese-boron steels contain the following alloying elements: 0.19-0.25% carbon, 1.10-1.40% manganese and 0.001-0.005% boron. It goes without saying that other steel grades can also be used in accordance with embodiments of the invention, provided that their strength values after the hardening lie in the region of e.g., >1300 MPa.

Moreover, the hot-formable steel of the blank can be provided with a corrosion-resistant layer, the blank or the coil being pre-coated. This affords the advantage that the sheet-metal component can be used again directly after the hardening, or can be transferred into the assembly, without an additional coating step being effected. As an alternative or in addition thereto, however, the corrosion-resistant layer can be applied in an additional process step, wherein the coating is effected optionally on the blank, on the cold-formed tube part, or on the high-strength tube part. The subsequent coating affords particularly good cladding of the complete tube part, and as a result a particularly high level of corrosion resistance. Aluminum-silicon coatings, zinc coatings, etc., are suitable in particular as coatings.

This invention makes it possible to produce tube parts with a yield point of e.g., >950 MPa and a tensile strength of e.g., >1300 MPa. This is achieved through the use according to the invention of indirect hot forming or the two-stage hot-forming method for producing such tube parts. In this method, firstly blanks are cut off from a coil made of hot-formable material. Thereafter, the blanks are cold-formed, as a result of which an unhardened tube part is formed. Particularly during the production of tube parts, the cold forming is effected in a plurality of steps, with the component being formed to its final geometry gradually in 10-20 pressing methods. During the cold forming, the blanks are formed by way of numerous drawing stages. In general, deep-drawing of the blank is effected in a first drawing stage. In successive forming stages, tube portions are introduced into the deep-drawn blank with the aid of a female mold and male mold, such that a tube part with its final shape is formed gradually. If required, a thread can be introduced in a last pressing step of the cold forming. Forming in a cold state affords higher degrees of freedom in terms of the deformability of the blank than forming in a hot state.

After the cold forming, the tube part can be machined, for example by the introduction of threads or by trimming to a desired contour. In this process, holes and punches can also be introduced in the soft, non-heat-treated state, since this is possible with lower pressing forces and cost-intensive laser or hard trimming can be dispensed with. The machining can also be effected only after the hardening of the tube part, however.

In a further step, the cold-formed tube parts are heated in a furnace to the austenitization temperature of approximately 900° C. In this working step, the tube part can optionally be heated completely, or only certain portions of the tube part can be heated, with other portions not being heated or being heated only slightly.

After the heating in the furnace, the tube part is cooled quickly. The cooling is effected in a mold, as a result of which firstly the strength of the steel is increased and secondly the geometry of the component is calibrated. In this mold, in which the component is cooled, residual forming can optionally take place. If only individual regions of the tube part have been heated in the furnace, the quick cooling produces an increase in strength only in the previously heated regions. Unheated regions or regions which are heated only below the austenitization temperature do not experience an increase in strength. In such unhardened regions, subsequent machining is still possible after the hardening or the hot-forming step of the component, without a high degree of wear of the machining tools having to be accepted.

With this method, it is possible to produce thin-walled components with high strength values, on which units such as transmissions, engines, engine mounts, receptacles for axle supports and the like can be mounted directly. As a result, a saving in weight can be achieved in the vehicle, and additional assembly processes such as, for example, the mounting of nuts can be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of mounting a unit of a motor vehicle, the method comprising the acts of:
   producing a sheet-metal blank;
   producing a tube part by cold forming the sheet-metal blank;
   hardening the cold formed tube part in a first portion by a hot-forming step and not hardening the cold formed tube part by the hot-forming step in a second portion, wherein the first portion has a yield point of >950 MP and a tensile strength of >1300 MPa;
   machining threads in the second portion of the cold formed tube part, wherein the act of machining the threads in the second portion of the cold formed tube part occurs before the act of hardening the cold formed tube part in the first portion; and
   mounting the unit of the motor vehicle onto the second portion of the cold formed tube part via the threads, wherein the cold formed tube part is disposed in a load path of a bodyshell of the motor vehicle;
   wherein the unit of the motor vehicle is a transmission, an engine, an engine mount, or a receptacle for an axle support.

2. The method according to claim 1, wherein a hot-formable steel is used as the material for the tube part.

3. The method according to claim 2, wherein the hot-formable steel is 22MnB5.

4. The method according to claim 2, wherein the hot-formable steel is provided with a corrosion-resistant layer.

5. The method according to claim 1, wherein a corrosion-resistant layer is applied to the blank, to the tube part, or to the first portion.

* * * * *